United States Patent [19]

Patel et al.

[11] Patent Number: 5,204,320
[45] Date of Patent: Apr. 20, 1993

[54] DRILLING MUD ADDITIVE COMPRISING FERROUS SULFATE AND POLY(N-VINYL-2-PYRROLIDONE/SODIUM 2-ACRYLAMIDO-2-METHYLPROPANE SULFONATE)

[75] Inventors: Bharat B. Patel; George G. Dixon, both of Bartlesville, Okla.

[73] Assignee: Phillips Petroleum Company, Bartlesville, Okla.

[21] Appl. No.: 789,208

[22] Filed: Nov. 7, 1991

[51] Int. Cl.$^5$ ............................................. C09K 7/02
[52] U.S. Cl. ................................................. 507/121
[58] Field of Search ...................................... 507/121

[56] References Cited

U.S. PATENT DOCUMENTS

| | | | |
|---|---|---|---|
| 4,076,628 | 2/1978 | Clampitt | 252/8.5 C |
| 4,486,318 | 12/1984 | Green | 252/8.5 A |
| 4,541,485 | 9/1985 | Block | 166/281 |
| 4,644,020 | 2/1987 | Stahl | 522/79 |
| 4,743,383 | 5/1988 | Stewart et al. | 252/8.51 |
| 4,951,921 | 8/1990 | Stahl et al. | 252/8.551 |

*Primary Examiner*—Gary L. Geist
*Attorney, Agent, or Firm*—A. W. Umphlett

[57] ABSTRACT

A water based drilling fluid composition and an additive for water based drilling fluid compositions having as components poly(N-vinyl-2-pyrrolidone/sodium 2-acrylamido-2-methylpropane sulfonate) and ferrous sulfate useful in controlling high temperature water loss in drilling a well to recover oil and gas from a subterranean formation in a hostile environment and their methods of use.

16 Claims, No Drawings

DRILLING MUD ADDITIVE COMPRISING FERROUS SULFATE AND POLY(N-VINYL-2-PYRROLIDONE/SODIUM 2-ACRYLAMIDO-2-METHYLPROPANE SULFONATE)

This invention relates to drilling compositions and methods for preparing said compositions. In one of its aspects it relates to improving the properties of known drilling fluids. In another aspect of the invention it relates to providing control of the viscosity and water loss properties of drilling mud. In narrow aspects of the invention it relates to drilling muds and drilling mud additives containing poly-(N-vinyl-2-pyrrolidone/-sodium 2-acrylamido-2-methylpropane sulfonate).

BACKGROUND OF THE INVENTION

In the art of drilling wells to tap subterranean deposits of natural resources, such as gas, geothermal steam or oil, especially when drilling by the rotary method or the percussion method wherein cuttings must be removed from the bore hole, it is necessary to use a drilling fluid, as is well known to those skilled in the art. The subject is discussed more fully in U.S. Pat. No. 3,025,234. In addition to having the desirable rheological properties such as viscosity and gel strength, it is very important that drilling fluids exhibit a low rate of filtration or water loss, that is, the drilling fluid must prevent excessive amounts of fluid, or "filtrate", from flowing from the drilling fluid in the bore hole into the surrounding formation. The loss of water or other fluid from the drilling fluid is prevented by the formation of a filter cake which deposits from the drilling fluid and seals the wall of the bore hole.

Since most drilling fluids are "non-Newtonian" fluids, the apparent viscosity at given conditions of shear rate and shearing stress may change in a non-linear manner with certain parameters. This property makes it difficult to provide drilling fluids which will perform within acceptable ranges during the entire process of drilling a well.

Measurable variables which may characterize the apparent viscosity of a drilling fluid include the plastic viscosity, yield point and the rate and degree of gelation. The viscosity of a fluid normally decreases with an increase in temperature, but certain polymer additives or deflocculating agents may reduce, or even reverse, this tendency. The long-chain polymers which are most effective in achieving this effect are the most vulnerable to breakdown through oxidation, shear and thermal effects, i.e., the duration of exposure to high temperature drilling operations. Also, many such polymers tend to precipitate and/or lose viscosity as well as effectiveness as water loss additives when exposed to dissolved electrolytes, particularly when divalent metal cations such as $Ca^{++}$ and $Mg^{++}$ are present. In drilling fluids, the resulting vulnerability to breakdown is exacerbated by the density of the mud, which is directly related to the weighting agents required for a given formation pressure. The extremely high temperatures encountered in drilling geothermal wells also tend to cause early breakdown of mud additives.

Breakdown of water loss control polymers or deflocculants causes a large increase in the fluid loss accompanied by an increase in filter cake thickness. The thickness of filter cake will be determined by the solids content of the mud. High density drilling fluids with large amounts of weighting materials produce very thick filter cakes when fluid loss control is lost. These conditions often result in differential sticking of the drill string. It is desirable to develop additives which will enable drilling fluids to retain their proper viscosity and fluid content over a broader range of conditions.

Specifically, water base drilling fluids containing poly(N-vinyl-2-pyrrolidone/sodium 2-acrylamido-2-methylpropane sulfonate) provide excellent fluid loss control in hostile environments. Poly(N-vinyl-2-pyrrolidone/sodium 2-acrylamido-2-methylpropane sulfonate), however, provides sufficient viscosity in drilling muds that enough of this material cannot be incorporated into high solids muds to attain the degree of fluid loss control that is most desirable. It has now been found that the viscosity 2-acrylamido-2-methylpropane sulfonate) can be reduced by using a suitable additive in conjunction with the poly(N-vinyl-2-pyrrolidone/-sodium 2-acrylamido-2-methylpropane sulfonate).

It is therefore an object of this invention to provide control of viscosity in drilling muds containing poly(N-vinyl-2-pyrrolidone/sodium 2-acrylamido-2-methylpropane sulfonate). It is another object of this invention to provide control of fluid loss in drilling muds containing poly(N-vinyl-2-pyrrolidone/sodium 2-acrylamido-2-methylpropane sulfonate). It is another object of this invention to provide drilling muds containing poly(N-vinyl-2-pyrrolidone/sodium 2-acrylamido-2-methylpropane sulfonate) in which the viscosity is controlled. It is still another object of this invention to provide drilling muds containing poly(N-vinyl-2-pyrrolidone/-sodium 2-acrylamido-2-methylpropane sulfonate) in which the fluid loss from the drilling mud is controlled.

Other aspects, objects and alternative embodiments of this invention will become apparent upon reading this specification and the appended claims.

STATEMENT OF THE INVENTION

According to this invention there is provided a water based drilling fluid composition having as components poly(N-vinyl-2-pyrrolidone/sodium 2-acrylamido-2-methylpropane sulfonate) and an amount of ferrous sulfate sufficient to reduce drilling fluid viscosity as compared to a drilling fluid having poly(N-vinyl-2-pyrrolidone/sodium 2-acrylamido-2-methylpropane sulfonate) as a component but without ferrous sulfate.

Also according to this invention there is provided an additive for water based drilling fluid compositions in which the additive has as components poly(N-vinyl-2-pyrrolidone/sodium 2-acrylamido-2-methylpropane sulfonate) and an amount of ferrous sulfate sufficient to reduce drilling fluid viscosity as compared to a drilling fluid having poly(N-vinyl-2-pyrrolidone/sodium 2-acrylamido-2-methylpropane sulfonate) as a component but without ferrous sulfate.

Also according to this invention, using the inventive composition there are provided both a method for controlling high temperature water loss in a hostile environment in a process for drilling a well to recover oil and gas from a subterranean formation in a hostile environment by circulating in a well in a hostile environment, while drilling, a drilling fluid composition having as components poly-(N-vinyl-2-pyrrolidone/sodium 2-acrylamido-2-methylpropane sulfonate) and an amount of ferrous sulfate sufficient to reduce the viscosity of the drilling fluid as compared to a drilling fluid having poly(N-vinyl-2-pyrrolidone/sodium 2- acrylamido-2-methylpropane sulfonate) as a component but without ferrous sulfate.

DETAILED DESCRIPTION OF THE INVENTION

Drilling fluids containing poly(N-vinyl-2-pyrrolidone/sodium 2-acrylamido-2-methylpropane sulfonate) are well known in the art. The preparation of the copolymer and background on the use of the copolymer is set out in U.S. Pat. No. 4,644,020, incorporated here by reference. In general, this copolymer can be used as the lone polymeric component in a composition for treating underground formations or can be used in conjunction with other polymeric components.

The drilling fluid and drilling fluid additive useful as a viscosity and water loss control agents in the compositions of this invention contain ferrous sulfate in an amount sufficient to reduce drilling fluid viscosity or control water loss in a hostile environment in a process for drilling a well to recover oil and gas from a subterranean formation in a hostile environment by circulating in a well in a hostile environment, while drilling, a drilling fluid composition having as components poly-(N-vinyl-2-pyrrolidone/sodium 2-acrylamido-2-methylpropane sulfonate) and an amount of ferrous sulfate sufficient to reduce the viscosity of the drilling fluid as compared to a drilling fluid having poly(N-vinyl-2-pyrrolidone/sodium 2-acrylamido-2-methylpropane sulfonate) as a component without the ferrous sulfate. The useful amount of ferrous sulfate generally falls within the range of about 5 to about 75 percent by weight based on the weight of the poly(N-vinyl-2-pyrrolidone/sodium 2-acrylamido-2-methylpropane sulfonate), preferably within the range of about 10 to about 50 percent by weight, most preferably within the range of about 15 to about 30 percent by weight.

The proportions of N-vinyl-2-pyrrolidone and sodium 2-acrylamido-2-methylpropane sulfonate for copolymers of this invention can vary widely. Generally, N-vinyl-2-pyrrolidone to sodium 2-acrylamido-2-methylpropane sulfonate weight ratios of about 10:90 to about 90:10, as applied to the mixture of monomers polymerized, are used, but copolymers having N-vinyl-2-pyrrolidone to sodium 2-acrylamido-2-methylpropane sulfonate weight ratios as low as 5:95 and as high as 99:1 can be prepared and employed for specialized applications. Generally, the minimum amount of the N-vinyl-2-pyrrolidone polymer required to produce copolymers of the desired characteristics will be used. For certain applications, e.g., drilling fluids, some of the preferred aged or unaged polymers can be subjected to temperatures as high as at least about 165° C. for periods of a few days, or temperatures as high as at least about 205° C. for periods of a few hours.

The poly(N-vinyl-2-pyrrolidone/sodium 2-acrylamido-2-methylpropane sulfonate) can be used in conjunction with various other materials, such as bases, surfactants, consurfactants, polymeric viscosifiers, crosslinking agents and the like, used singly or in combination. For example, the bases can be water-soluble bases selected from the group consisting of alkali and alkaline earth metal hydroxides, ammonium hydroxides, alkali metal carbonates and chemical buffer salts which dissolve with hydrolysis to yield alkaline fluids, such as sodium phosphate, sodium borates and sodium silicates, or combinations of at least two of said bases.

Surfactants can be selected from anionic, cationic or nonionic surfactants, suitable anoinic surfactants include petroleum sulfonates, alkali metal carboxylates such as sodium oleate, carboxyalkylated or sulfonated polyethyoxylated alkyl phenols, carboxylated or sulfonated polyethyoxylated phenols, carboxylated, sulfonated or sulfonated polyethoxylated alcohols or sulfonated polyethoxylated thiols. Suitable cationic surfactants include long chain alcohols, alkyl phenols, carboxylic acids, amines and thiols. These surfactants can be used in combination or mixtures.

Suitable cosurfactants can be polar organic compounds selected from the group consisting of saturated and unsaturated alcohols having from 3 to about 10 carbon atoms, phenols, amines, esters, mercaptans, aldehydes, ketones, amides, sulfoxides, organic nitro compounds, organic nitriles, sulfones, urea, and polythoxylated alcohols. These cosurfactants can be used in combinations or mixtures.

Polymeric viscosifiers can be, for example, biopolysaccharides, cellulose ethers, acrylamide-derived polymers, or mixtures thereof. Crosslinking agents can be selected from various suitable crosslinking agents. Examples include various aldehydes and trivalent metal cations such as $Al^{+3}$, $Cr^{+3}$, and $Fe^{+3}$. For example, aluminum citrate can be used admixed with the polymer or in slugs alternating with polymer slugs. Soluble compounds $Cr^{+3}$, and $Fe^{+3}$ can be used, or oxidizable compounds of divalent iron such as $FeCl_2$ cab be used in conjunction with a gaseous oxidant such as air or oxygen. Phenols or phenolic materials such as lignites can be used. Also, redox systems such as sodium dichromate and sodium bisulfide can be used.

Any suitable amount of compositions of this invention can be used in embodiments of the invention concerning the recovery and processing of natural resources. The compositions of this invention can be used to improve the process of drilling a borehole in a subterranean formation, by circulating in the borehole a drilling fluid comprising fresh or salt water, clays, weighting agents and other drilling fluid ingredients. These compositions are particularly suitable for drilling fluid additives in formations having high temperatures, salinity content and content of hardness ions, since they tend to retain their viscosity well even when aged at elevated temperatures in saline and/or hard water. In addition to use as a drilling fluid additive, the suitable viscosity, and improving the fluid's ability to suspend weighting agent.

When introduced into a well bore in processes for the drilling, completion or workover of wells, the polymers can be used in small amounts effective to achieve the effects desired, such as reduction of high temperature water loss, suspension of weighting agents and the like. As a general guide, the amount of polymer used will be in the range from about 0.10 percent to about 5 percent, preferably 0.5 to about 5 pounds per barrel of fluid. Those skilled in the art can determine the amount of polymer to be used by suitable experiments in light of this disclosure. The polymers are useful in such applications at temperatures up to at least about 205° C.

EXAMPLE I

In this example a polymer emulsion was prepared for testing according to a method outside this invention. In a 1 quart jar, 300 grams of salt water mud—which is the mixture in a proportion of 1932 grams of NaCl, 181 grams of Attapulgite clay and 273 grams of Rev dust (a simulated drill solid obtained from Milwhite Co. Inc., Houston, Tex.) per 5500 mL. of deionized water—and 4 grams of Attapulgite clay were stirred together for 10 minutes on a Multimixer. 60 grams of barite was added to the mixture and stirred for 1 minute on a Hamilton Beach mixer. 10 grams of the polymer emulsion which contained about 33 percent by weight poly(N-vinyl-2-pyrrolidone/sodium 2-acrylamido-2-methylpropane sulfonate) was added and this mixture was stirred for 20 minutes on a Multimixer. The drilling mud mixture was then tested according to A.P.I. RP 13 B.

EXAMPLE II

In this example a polymer emulsion was prepared for testing according to this invention. 10 grams of FeSO$_4$.7H$_2$O and 90 grams of the polymer emulsion containing about 33 percent by weight poly(N-vinyl-2-pyrrolidone/sodium 2-acrylamido-2-methylpropane sulfonate) prepared in Example I were mixed for five minutes using moderately high speed on a Hamilton Beach mixer. No change in the grams of the polymer emulsion containing about 33 percent by weight poly(N-vinyl-2-pyrrolidone/sodium 2-acrylamido-2-methylpropane sulfonate) prepared in Example I were mixed for five minutes using moderately high speed on a Hamilton Beach mixer. No change in the physical appearance of the emulsion was observed. The mixture was rolled at room temperature for 72 hours using a roller oven. The color of the emulsion changed from opaque cream to orange-yellow with a slight, brown precipitate of insoluble FeSO$_4$.7H$_2$O.

300 grams of salt water mud and 4 grams of Attapulgite clay were stirred together in a 1 quart jar for 10 minutes on a Multimixer. 60 grams of barite was added to the mixture and stirred for 1 minute on a Hamilton Beach mixer. 11.1 grams of the poly(N-vinyl-2-pyrrolidone/sodium 2-acrylamido-2-methylpropane sulfonate)/FeSO$_4$.7H$_2$O, prepared above, was added and this mixture was stirred for 20 minutes on a Multimixer. The drilling mud mixture was then tested according to A.P.I. RP 13 B.

EXAMPLE III

The drilling mud mixtures of Example I and Example II were tested according to A.P.I. RP 13 B as freshly made, sample I and sample II, and then the mixtures were aged for 16 hours at 149° C., cooled to room temperature, stirred for 2 minutes on a Multimixer and retested, sample I aged and sample II aged. The results of the testing are set out below in Table I.

TABLE I

| Sample | Viscometer 600 rpm[1] | 300 rpm[2] | PV[3] | YP[4] | Gels[5] | Water Loss[6] Room Temp. | High Temp. |
|---|---|---|---|---|---|---|---|
| I | 132 | 94 | 38 | 56 | 17/28 | 4.2 | — |
| II | 96 | 62 | 34 | 28 | 17/26 | 5.8 | — |
| I aged | 131 | 81 | 50 | 31 | 11/28 | 12.4 | 31.4 |
| II aged | 100 | 56 | 44 | 12 | 2/11 | 10.6 | 25.6 |

[1]direct reading from Fann Viscometer
[2]direct reading from Fann Viscometer
[3]PV - Plastic Viscosity, cp
[4]YP - Yield Point, lb./100 sq. ft.
[5]Gels - Gel Strength, (10 sec./10 min.)/(lb./100 sq. ft.)
[6]Water Loss, API water loss, mL./30 min.

It can be readily seen from the data recorded in the table above that a drilling mud mixture containing both poly(N-vinyl-2-pyrrolidone/sodium 2-acrylamido-2-methylpropane sulfonate) and FeSO$_4$.7H$_2$O has reduced viscosity and reduced water loss as compared to a drilling mud mixture containing poly(N-vinyl-2-pyrrolidone/sodium 2-acrylamido-2-methylpropane sulfonate) without FeSO$_4$.7H$_2$O.

We claim:

1. An additive for water based drilling fluid compositions, said additive comprising poly(N-vinyl-2-pyrrolidone/sodium 2-acrylamido-2-methylpropane sulfonate) and an amount of ferrous sulfate sufficient to reduce drilling fluid viscosity as compared to a drilling fluid comprising poly(N-vinyl-2-pyrrolidone/sodium 2-acrylamido-2-methylpropane sulfonate) without said ferrous sulfate.

2. A composition of claim 1 wherein the amount of ferrous sulfate in said composition is within the range of about 5 to about 75 percent by weight based on the weight of the poly(N-vinyl-2-pyrrolidone/sodium 2-acrylamido-2-methylpropane sulfonate).

3. A composition of claim 2 wherein the amount of ferrous sulfate in said composition is within the range of about 10 to about 50 percent by weight based on the weight of the poly(N-vinyl-2-pyrrolidone/sodium 2-acrylamido-2-methylpropane sulfonate).

4. A composition of claim 3 wherein the amount of ferrous sulfate in said composition is within the range of about 15 to about 30 percent by weight based on the weight of the poly(N-vinyl-2-pyrrolidone/sodium 2-acrylamido-2-methylpropane sulfonate).

5. A water based drilling fluid composition comprising poly(N-vinyl-2-pyrrolidone/sodium 2-acrylamido-2-methylpropane sulfonate) and an amount of ferrous sulfate sufficient to reduce drilling fluid viscosity as compared to a drilling fluid comprising poly(N-vinyl-2-pyrrolidone/sodium 2-acrylamido-2-methylpropane sulfonate) without said ferrous sulfate.

6. A composition of claim 5 wherein the amount of ferrous sulfate in said composition is within the range of about 5 to about 75 percent by weight based on the weight of the poly(N-vinyl-2-pyrrolidone/sodium 2-acrylamido-2-methylpropane sulfonate).

7. A composition of claim 6 wherein the amount of ferrous sulfate in said composition is within the range of about 10 to about 50 percent by weight based on the weight of the poly(N-vinyl-2-pyrrolidone/sodium 2-acrylamido-2-methylpropane sulfonate).

8. A composition of claim 7 wherein the amount of ferrous sulfate in said composition is within the range of about 15 to about 30 percent by weight based on the weight of the poly(N-vinyl-2-pyrrolidone/sodium 2-acrylamido-2-methylpropane sulfonate).

9. A method for controlling high temperature water loss in a hostile environment comprising circulating in said hostile environment a drilling fluid comprising poly-(N-vinyl-2-pyrrolidone/sodium 2-acrylamido-2-methylpropane sulfonate) and an amount of ferrous sulfate sufficient to reduce drilling fluid viscosity as compared to a drilling fluid comprising poly(N-vinyl-2-pyrrolidone/sodium2-acrylamido-2-methylpropane sulfonate) without said ferrous sulfate.

10. A method of claim 9 wherein the amount of ferrous sulfate in said composition is within the range of about 5 to about 75 percent by weight based on the weight of the poly(N-vinyl-2-pyrrolidone/sodium 2-acrylamido-2-methylpropane sulfonate).

11. A method of claim 10 wherein the amount of ferrous sulfate in said composition is within the range of about 10 to about 50 percent by weight based on the weight of the poly(N-vinyl-2-pyrrolidone/sodium 2-acrylamido-2-methylpropane sulfonate).

12. A method of claim 11 wherein the amount of ferrous sulfate in said composition is within the range of about 15 to about 30 percent by weight based on the weight of the poly(N-vinyl-2-pyrrolidone/sodium 2-acrylamido-2-methylpropane sulfonate).

13. A method of drilling a well to recover oil and gas from a subterranean formation in a hostile environment comprising circulating in the well while drilling a drilling fluid comprising poly-(N-vinyl-2-pyrrolidone/sodium 2-acrylamido-2-methylpropane sulfonate) and an amount of ferrous sulfate sufficient to reduce drilling fluid viscosity as compared to a drilling fluid comprising poly(N-vinyl-2-pyrrolidone/sodium 2-acrylamido-2-methylpropane sulfonate) without said ferrous sulfate.

14. A method of claim 13 wherein the amount of ferrous sulfate in said composition is within the range of about 5 to about 75 percent by weight based on the weight of the poly(N-vinyl-2-pyrrolidone/sodium 2-acrylamido-2-methylpropane sulfonate).

15. A method of claim 14 wherein the amount of ferrous sulfate in said composition is within the range of about 10 to about 50 percent by weight based on the weight of the poly(N-vinyl-2-pyrrolidone/sodium 2-acrylamido-2-methylpropane sulfonate).

16. A method of claim 15 wherein the amount of ferrous sulfate in said composition is within the range of about 15 to about 30 percent by weight based on the weight of the poly(N-vinyl-2-pyrrolidone/sodium 2-acrylamido-2-methylpropane sulfonate).

* * * * *